T. N. ROBINSON.
TRACK CLAMP.
APPLICATION FILED JAN. 24, 1914.
1,114,526.
Patented Oct. 20, 1914.
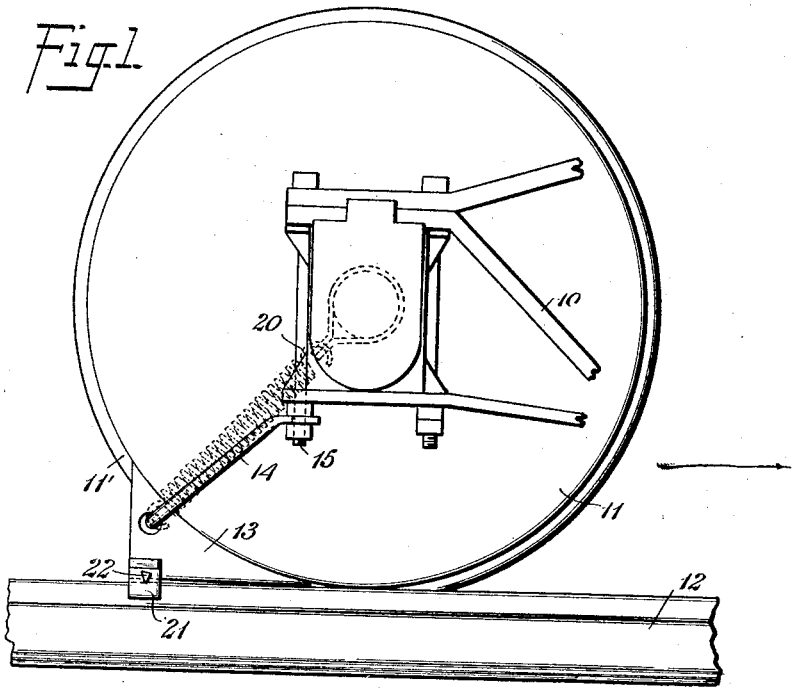
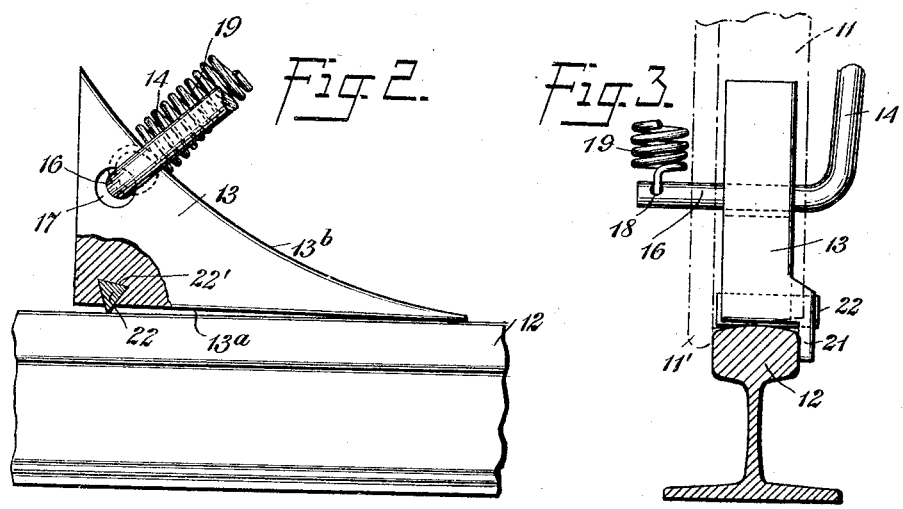
WITNESSES
George L. Blume.
Geo. L. Beeler
INVENTOR
Thomas N. Robinson
BY
ATTORNEYS

UNITED STATES PATENT OFFICE.

THOMAS NELSON ROBINSON, OF MECHANICSVILLE, NEW YORK.

TRACK-CLAMP.

1,114,526.   Specification of Letters Patent.   Patented Oct. 20, 1914.

Application filed January 24, 1914. Serial No. 814,087.

*To all whom it may concern:*

Be it known that I, THOMAS N. ROBINSON, a subject of the King of Great Britain, and a resident of Mechanicsville, in the county of Saratoga and State of New York, have invented a new and Improved Track-Clamp, of which the following is a full, clear, and exact description.

This invention relates to track clamps or grips used in connection with railway tracks and truck wheels.

Among the objects of the invention is to provide a device of the character indicated for use in connection with a truck wheel whereby the clamp will automatically act between the wheel and the rail to prevent movement of the wheel or truck in the direction of the clamp.

A further object of the invention is to improve this class of devices with respect to reliability of operation and facility with which the biting element thereof may be renewed or replaced or with which the entire clamp may be detached or swung out of the way when not to be used for a clamping purpose.

The foregoing and other objects of the invention will hereinafter be more fully described and claimed and illustrated in the drawings forming a part of this specification in which like characters of reference indicate corresponding parts in all the views, and in which—

Figure 1 is a side elevation of a fragment of railway rail, a railway wheel and truck thereon, and one of my improved clamps in operative position; Fig. 2 is an enlarged view of the clamp with parts broken away; and Fig. 3 is a rear elevation of the same.

The several parts of the device may be made of any suitable materials, and the relative sizes and proportions thereof, as well as the general design of the mechanism, may be varied to a considerable extent without departing from the spirit of the invention hereinafter more fully set forth and specifically claimed.

At 10 I show a portion of a power or steam shovel truck frame having associated therewith a wheel 11 rolling upon a rail 12. It will be understood that I may employ a clamp 13 in connection with each wheel of the car or truck, but since the operation of all will correspond to one of these devices, I show but one.

The clamp block 13 has a substantially flat base surface 13$^a$ lying above the rail and a curved surface 13$^b$ corresponding to the tread of the wheel 11 against which it operates. The point 13$^c$ of the block is carried along between the rear portion of the wheel and the upper surface of the track by any suitable means, whereby the block bearing against or biting into said rail will prevent the rearward movement of the wheel or truck. As a preferred means for securing the block to the truck for automatic operation, I provide an arm 14 connected to one of the vertical bolts 15 of the truck frame, and said arm is adapted to swing around in a horizontal direction or around the axis of said bolt so as to allow the block to be withdrawn from beneath the wheel and carried on the same temporarily, when it is desired to back up the car or truck. Said arm 14 has an elbow extension 16 leading laterally through a hole 17 in the upper part of the block 13 and has attached to its free end at 18 a spring 19 whose other end is detachably connected by means of a hook 20 or the like to the axle or other part of the truck. The force of the spring normally holds the block in the position shown in Fig. 1, and against the outer surface of the flange 11′ of the wheel, or with a lip 21 extending downwardly from the outer surface of the block lying snugly against the side edge of the rail. The truck may be moved forwardly, therefore, freely, but the block will always be in position when desired to prevent the rearward movement of the truck. By unhooking the spring 19, the block and its arm 14 may be swung around the axis of the bolt 15 out of engaging position.

At 22 I show a detachable tooth preferably in the form of a triangular prism inserted into the bottom of the block in a seat 22′ and having its biting edge extending slightly below the base surface 13$^a$ for direct engagement with the rail. Said tooth 22 may extend through the lip 21 to facilitate the change of said tooth for a new one in the event of breakage or wear thereof. By the provision of a renewable tooth of this character, the block may be made of a cheaper material than would be required if the biting portion of the device were made integral therewith.

Having thus described my invention, I claim as new and desire to secure by Letters Patent:—

1. The combination with a railway rail and a wheel rolling thereon, of a clamping block conforming to the periphery of the wheel, means to support the block between the wheel and the rail, said supporting means providing for the swinging of the block laterally around a vertical axis, means normally resisting said swinging movement, and means carried by the outer side of the block to limit the inward movement of the block under the force of said resisting means.

2. The combination with a railway rail and a wheel rolling thereon, of a clamping block conforming to the periphery of the wheel, said block having a hole extending laterally therethrough, a supporting arm having connection with the block through said hole, and a spring connected to the inner end of the arm serving to hold the block in normal operative position.

3. The combination with a rail, a wheel rolling thereon, and an axle, of a gripping block operating between the periphery of the wheel and the rail, an arm pivoted at its upper end on a vertical pivot on one side of the wheel, and having an elbow extending laterally adjacent the block, and a resilient member on the side of the wheel opposite from the arm connected at one end to one end of said elbow and detachably connected at its other end to said axle and serving to insure automatic action of the gripping block.

In testimony whereof I have signed my name to this specification in the presence of two subscribing witnesses.

THOMAS NELSON ROBINSON.

Witnesses:
OSCAR WARNER,
FARRINGTON L. MEAD.

Copies of this patent may be obtained for five cents each, by addressing the "Commissioner of Patents, Washington, D. C."